US012554955B2

(12) United States Patent
Yoshida

(10) Patent No.: US 12,554,955 B2
(45) Date of Patent: Feb. 17, 2026

(54) MEDIUM PROCESSING DEVICE AND IMAGE FORMING DEVICE

(71) Applicant: Toshiba Tec Kabushiki Kaisha, Tokyo (JP)

(72) Inventor: Kentaro Yoshida, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 90 days.

(21) Appl. No.: 18/416,339

(22) Filed: Jan. 18, 2024

(65) Prior Publication Data

US 2024/0249097 A1 Jul. 25, 2024

(30) Foreign Application Priority Data

Jan. 20, 2023 (JP) ................................ 2023-007505

(51) Int. Cl.
*G06K 17/00* (2006.01)
*G06K 7/10* (2006.01)

(52) U.S. Cl.
CPC ..... *G06K 17/0025* (2013.01); *G06K 7/10465* (2013.01)

(58) Field of Classification Search
CPC ........................ G06K 17/0025; G06K 7/10465
USPC ..................................................... 340/10.51
See application file for complete search history.

(56) References Cited

U.S. PATENT DOCUMENTS

| 7,073,712 | B2 * | 7/2006 | Jusas | G06K 5/02 235/383 |
| 9,147,137 | B2 * | 9/2015 | Kuniya | G06K 17/0025 |
| 10,114,991 | B2 * | 10/2018 | Kowata | G06K 1/121 |
| 10,255,535 | B1 * | 4/2019 | Takada | G06K 17/0025 |
| 2005/0029350 | A1 * | 2/2005 | Jusas | G06K 5/02 235/451 |
| 2005/0116034 | A1 * | 6/2005 | Satake | G06K 17/00 235/432 |
| 2006/0006885 | A1 * | 1/2006 | Helmut Bode | G06K 7/0095 324/555 |
| 2008/0094183 | A1 * | 4/2008 | Fukushima | G06F 21/79 340/10.51 |
| 2010/0245058 | A1 * | 9/2010 | Kojima | B41J 3/4075 340/10.52 |

(Continued)

FOREIGN PATENT DOCUMENTS

JP 2006018455 A 1/2006

*Primary Examiner* — Zhen Y Wu
(74) *Attorney, Agent, or Firm* — Kim & Stewart LLP

(57) ABSTRACT

A medium processing device includes a conveying mechanism, an RFID device, and a processor. The processor controls the RFID device to perform a write process on first and second RFID tags of at least one medium conveyed by the conveying mechanism when the first and second RFID tags are moved to a write position along a conveyance path of the at least one medium, and a read process on the first and second RFID tags after the at least one medium is further conveyed along the conveyance path of the at least one medium by the conveying mechanism. The RFID device includes an antenna by which the RFID device communicates with the RFID tags and is configured to set a communication range of the antenna to a first communication range during the write process and to a second communication range wider than the first communication range during the read process.

20 Claims, 6 Drawing Sheets

(56) References Cited

U.S. PATENT DOCUMENTS

| | | | |
|---|---|---|---|
| 2013/0234837 A1* | 9/2013 | Li ...................... | G06K 19/0723 340/10.51 |
| 2016/0110570 A1* | 4/2016 | Nebout .............. | G06K 7/10089 340/10.51 |
| 2017/0169262 A1* | 6/2017 | Kowata ................... | G06K 5/00 |
| 2018/0165487 A1* | 6/2018 | Hori ................... | G06K 7/10316 |

* cited by examiner

MEDIUM PROCESSING DEVICE AND IMAGE FORMING DEVICE

CROSS-REFERENCE TO RELATED APPLICATION(S)

This application is based upon and claims the benefit of priority from Japanese Patent Application No. 2023-007505, filed on Jan. 20, 2023, the entire contents of which are incorporated herein by reference.

FIELD

Embodiments described herein relate to a medium processing device and an image forming device.

BACKGROUND

In the related art, some image forming devices such as digital multi-functional peripherals are provided with an RFID device that has a function of writing data to an RFID tag provided on a medium on which an image is to be formed. The image forming device provided with the RFID device writes the data to the RFID tag provided on the medium such as paper while conveying the medium.

In some cases, if the medium has a plurality of RFID tags, the image forming device may write incorrect data to the plurality of RFID tags. In the related art, the RFID device performs a process of confirming that the data is correctly written during a write process of writing the data to each RFID tag. However, the image forming device provided with the RFID device cannot confirm whether the data is correctly written to each of the plurality of RFID tags of the medium. For example, if an RFID tag is unintentionally overwritten with data for another RFID tag, the medium will have an RFID tag to which intended data has not been written.

DETAILED DESCRIPTION

Embodiments provide a medium processing device and an image forming device capable of confirming that data is correctly written to a plurality of RFID tags.

In general, according to one embodiment, a medium processing device includes a conveying mechanism, an RFID device, and a processor. The RFID device communicates with RFID tags. The processor executes a job according to which the processor controls the RFID device to perform a write process on first and second RFID tags of at least one medium conveyed by the conveying mechanism when the first and second RFID tags are moved to a write position along a conveyance path of the at least one medium, and a read process on the first and second RFID tags after the at least one medium is further conveyed along the conveyance path of the at least one medium by the conveying mechanism. The RFID device includes an antenna by which the RFID device communicates with the RFID tags and is configured to set a communication range of the antenna to a first communication range during the write process and to a second communication range wider than the first communication range during the read process. The write process includes a first process to write data to the first RFID tag and verify that correct data has been written to the first RFID tag and a second process to write data to the second RFID tag and verify that correct data has been written to the second RFID tag, and the read process includes a third process to further verify that correct data has been written to the first and second RFID tags.

Hereinafter, the present embodiment will be described with reference to the drawings. First, a configuration of a digital multi-functional peripheral (MFP) 1 as an image forming device including a medium processing device according to the embodiment will be described.

Figure 1:
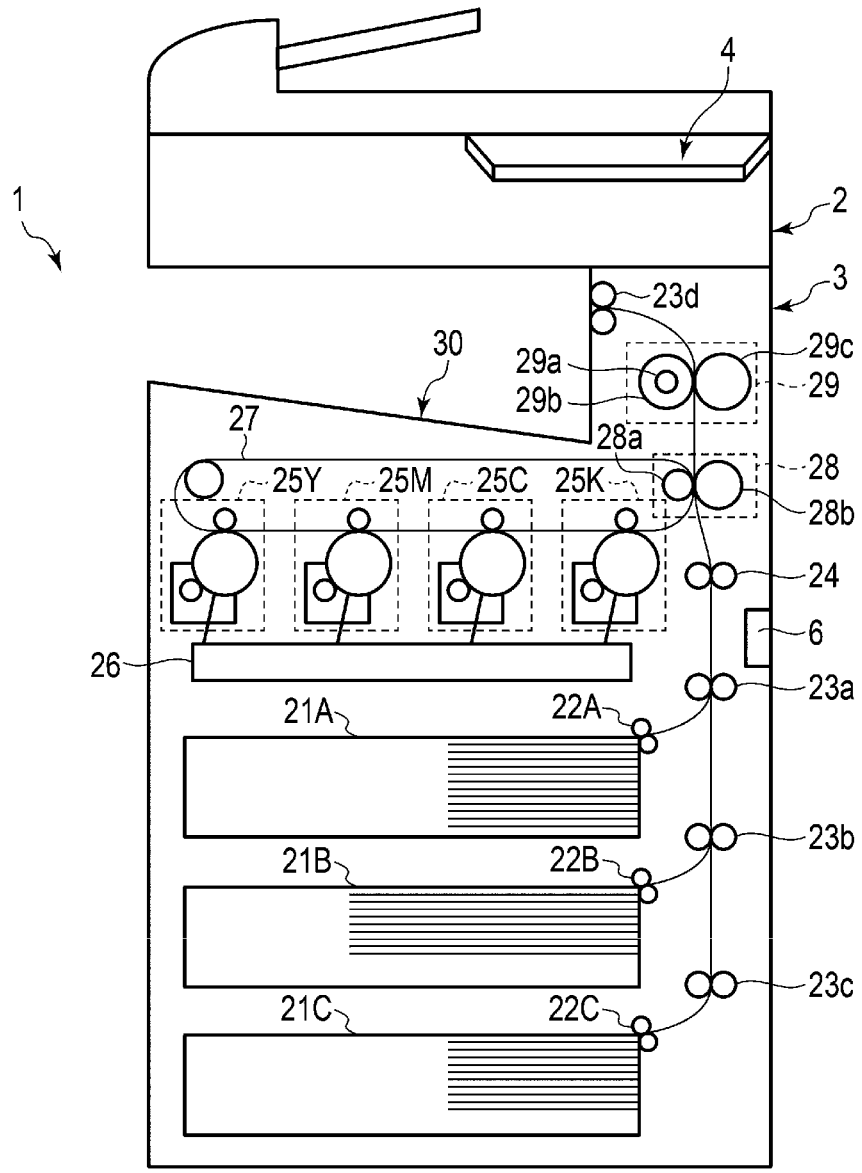
FIG. 1 is a cross-sectional view illustrating a configuration example of a digital multi-functional peripheral as an image forming device including a medium processing device according to one embodiment.

FIG. 1 is a cross-sectional view schematically illustrating a configuration example of the digital multi-functional peripheral 1 as the image forming device including the medium processing device according to the embodiment. As illustrated in FIG. 1, the digital multi-functional peripheral 1 includes a scanner 2, a printer 3, an operation panel 4, and an RFID device 6.

The scanner 2 is installed on an upper portion of a main body of the digital multi-functional peripheral 1. The scanner 2 is a device that optically reads an image of a document. The scanner 2 has a platen glass on which the document to be scanned is placed. The scanner 2 has an image reading mechanism for scanning the document on the platen glass. The image reading mechanism of the scanner 2 is configured with a carriage and a photoelectric conversion unit installed below the platen glass. In addition, the scanner 2 may be provided with an auto document feeder (ADF).

The printer (more generally referred to as an image forming mechanism) 3 includes paper feed cassettes 21A, 21B, and 21C. Each of the paper feed cassettes 21A, 21B, and 21C stores a medium such as paper to be processed. The medium stored in the paper feed cassettes 21A, 21B, and 21C may be a medium that can be conveyed by a conveyance system described later. For example, each of the paper feed cassettes 21A, 21B, and 21C can be attached to and detached from a lower portion of the main body of the digital multi-functional peripheral 1. Each of the paper feed cassettes 21A, 21B, and 21C has paper feed rollers 22A, 22B, and 22C, respectively. Each of the paper feed rollers 22A, 22B, and 22C picks up one sheet of paper from each of the paper feed cassettes 21A, 21B, and 21C. In the present embodiment, it is assumed that one of the paper feed cassettes 21A, 21B, and 21C stores the medium provided with the plurality of RFID tags.

A conveyance system (including a conveying mechanism) 23 conveys the medium (e.g., paper) in the printer 3. The conveyance system 23 includes a plurality of conveyance rollers 23a to 23d, a registration roller 24, and the like. The conveyance system 23 conveys the paper picked up by the paper feed rollers 22A, 22B, and 22C to the registration roller 24. The registration roller 24 conveys the paper to a transfer position at the timing of transferring the image.

A plurality of image forming units 25 (25Y, 25M, 25C, and 25K) form images of respective colors (yellow, magenta, cyan, and black). An exposure device 26 forms an electrostatic latent image as an image developed in each color on each image carrier in each of the image forming units 25 (25Y, 25M, 25C, and 25K). The exposure device 26 forms the electrostatic latent image on the image carrier by scanning the image carrier with light emitted according to image data. For example, the exposure device 26 performs scanning in a main scanning direction by irradiating a photosensitive drum as the image carrier with light emitted by a light emitting unit, through the polygon mirror for rotating the light. Further, an irradiation position of the light from the exposure device 26 moves in a sub-scanning direction as the photosensitive drum rotates. The position and magnification of the image formed by the image forming unit 25 are adjusted by controlling the exposure device 26.

Each of the image forming units 25 (25Y, 25M, 25C, and 25K) develops the electrostatic latent image on each of the image carriers with toner of the respective colors (yellow, magenta, cyan, and black). An intermediate transfer belt 27 is the intermediate transfer member. Each image forming unit 25 transfers the toner image of each color developed with the toner of each color on each image carrier onto the intermediate transfer belt 27.

The intermediate transfer belt 27 holds the transferred toner image and feeds the toner image to a secondary transfer position. The secondary transfer position is a position where the toner image on the intermediate transfer belt 27 is transferred onto the paper. The secondary transfer position is a position where a support roller 28a and a secondary transfer roller 28b face each other. The support roller 28a and the secondary transfer roller 28b form a transfer unit 28. The registration roller 24 conveys the paper to the secondary transfer position in timing with the toner image on the intermediate transfer belt 27. The transfer unit 28 transfers the toner image held on the intermediate transfer belt 27 onto the paper at the secondary transfer position.

For example, when forming the color image, each of the image forming units 25Y, 25M, 25C, and 25K superimposes and transfers the toner images developed with the toner of each color (yellow, magenta, cyan, and black) onto the intermediate transfer belt 27. The intermediate transfer belt 27 holds the color image in which the toner images of the respective colors are superimposed. The transfer unit 28 transfers the color image formed by the toners of the plurality of colors on the intermediate transfer belt 27 onto the paper at the secondary transfer position. The registration roller 24 conveys the paper to the secondary transfer position in timing with the toner image on the intermediate transfer belt 27. Accordingly, the color image is transferred onto the paper.

The transfer unit 28 supplies the paper onto which the toner image is transferred to a fixing device 29. The fixing device 29 fixes the toner image onto the paper. The fixing device 29 includes a heating unit 29a, a heating roller 29b, and a pressure roller 29c. The heating unit 29a heats the heating roller 29b. The heating roller 29b and the pressure roller 29c perform a fixing process of heating the paper onto which the toner image is transferred by the transfer unit 28 while being pressed. The heating roller 29b and the pressure roller 29c in the fixing device 29 feed the paper on which the fixing process is performed to the conveyance roller 23d. The conveyance roller 23d conveys the paper from the fixing device 29 to a paper discharge unit 30.

The operation panel 4 is a user interface. The operation panel 4 displays a guidance or receives input of operation buttons or icons. For example, the user inputs setting information on the operation panel 4. The operation panel 4 includes a display unit (including a display) 41, a touch panel 42, and a plurality of operation buttons 43. For example, the touch panel 42 is provided on a display screen of the display unit 41. The touch panel 42 detects the portion touched by the user on the display screen of the display unit 41.

The RFID device 6 communicates with the RFID tag provided on the medium. The RFID device is a reader and writer that writes data to the RFID tag and reads the data written to the RFID tag. The RFID device 6 is installed in the image forming device 1 so as to communicate with the RFID tag provided on the medium conveyed by the conveyance system 23 in the printer 3. The RFID device 6, the conveyance system 23, and a system control unit 5 (refer to FIG. 2) described later, configure the medium processing device.

The RFID device 6 writes data to the RFID tag provided on the medium at a predetermined write position on a conveyance path of the medium. If the medium to be conveyed by the conveyance system 23 has a plurality of RFID tags, the RFID device 6 writes the data to each RFID tag at the timing of passing through the write position. Accordingly, the RFID device can write data to the plurality of RFID tags of the medium.

In addition, the RFID device 6 reads the data written to all the RFID tags of the medium after passing through the write position on the conveyance path. For example, the RFID device 6 widens a communication range by strengthening radio waves of the carrier wave output to the RFID tag. The RFID device 6 performs a read process in which all the RFID tags of the medium are read targets, by outputting the radio waves so that the entire medium after passing through the write position is in the communication range.

It is noted that, in the configuration example illustrated in FIG. 1, the RFID device 6 communicates with the RFID tag of the medium at a position before the image is transferred to the medium. The RFID device 6 is configured to write the data to individual RFID tags of the medium conveyed by the conveyance system 23, and read the data from all the RFID tags of the medium to which the data is written. The RFID device 6 may be installed anywhere (e.g., at a position after the image is transferred to the medium) as long as the installation position is along the conveyance path of the medium. In addition, the RFID device 6 may be an external device that can be attached to and detached from interfaces provided in the digital multi-functional peripheral 1.

Figure 2:
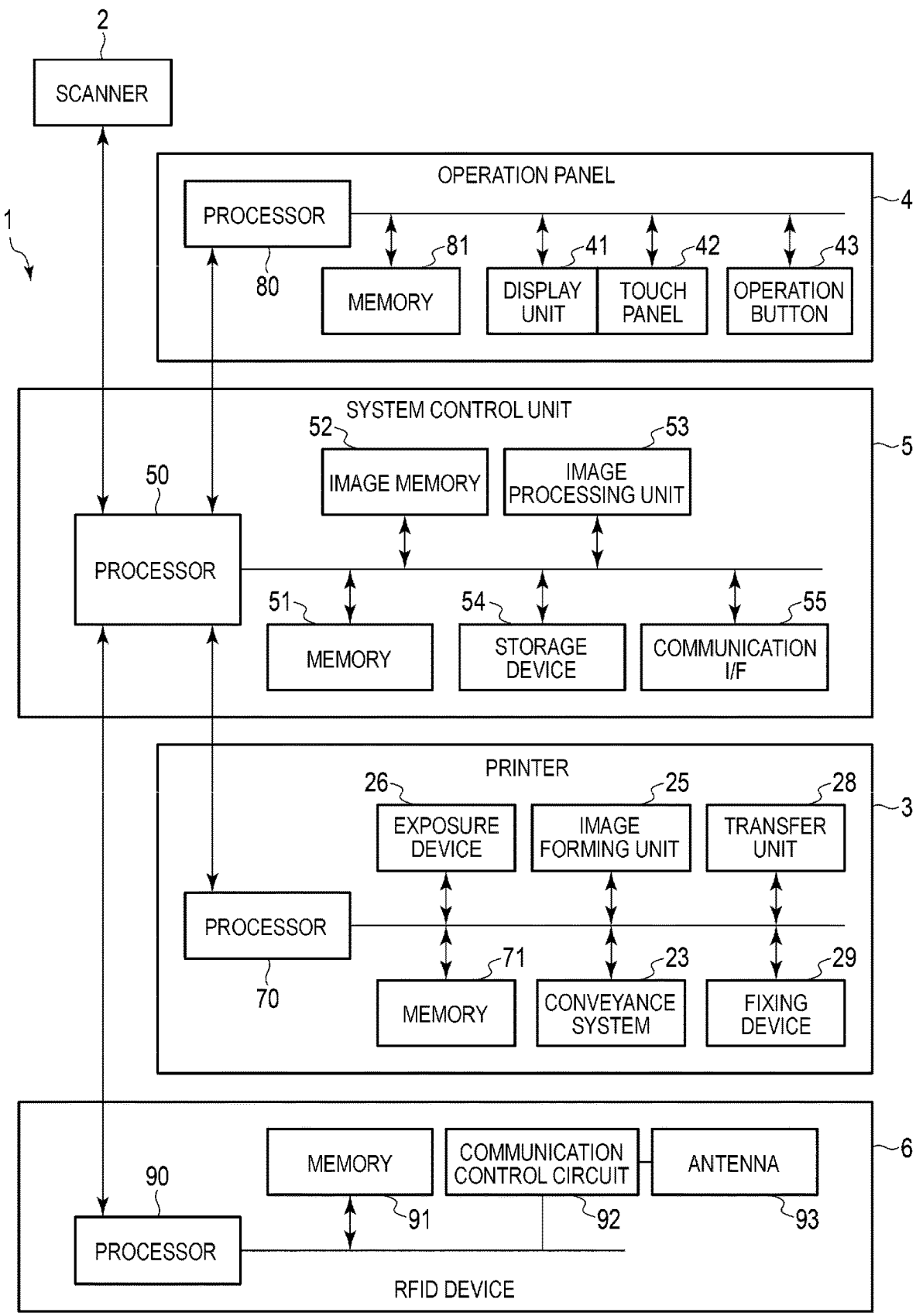
FIG. 2 is a block diagram illustrating a configuration example of a control system in the digital multi-functional peripheral.

Next, a configuration of a control system in the digital multi-functional peripheral 1 configured as described above will be described. FIG. 2 is a block diagram illustrating the configuration example of the control system in the digital multi-functional peripheral 1. The digital multi-functional peripheral 1 includes the system control unit 5 that controls the entire device. The system control unit 5 is connected to the scanner 2, the printer 3, the operation panel 4, and the RFID device 6. In the configuration example illustrated in FIG. 2, the system control unit 5 is a circuit that includes a processor 50, a memory 51, an image memory 52, an image processing unit 53, a storage device 54, a communication interface (I/F) 55, and the like.

The processor 50 is connected to the scanner 2, a processor 70 of the printer 3, a processor 80 of the operation panel 4, and a processor 90 of the RFID device 6 via interfaces. The processor 50 implements various processing functions by executing programs stored in the memory 51 or the storage device 54. For example, the processor 50 outputs the operation instructions to each unit or processes various kinds of information from each unit by executing the programs stored in the memory 51.

The memory 51 includes memories such as a random access memory (RAM), a read only memory (ROM), and a non-volatile memory (NVM). The RAM functions as a working memory or a buffer memory. The ROM is a non-rewritable and non-volatile memory. The ROM functions as a program memory. The NVM is a rewritable and non-volatile memory. The NVM stores setting data and the like. The image memory 52 stores the image data. For example, the image memory 52 functions as a page memory for loading the image data to be processed.

The image processing unit 53 processes the image data. The image processing unit 53 outputs the image data obtained by performing image processing such as correction, compression, or expansion on the input image data. The image processing unit 53 also includes a processor for the image processing. It is assumed that the processor for the image processing in the image processing unit 53 has a variable operating frequency (operating speed). The image processing unit 53 changes a processing time required for the image processing by changing the operating frequency of the processor. For example, the image processing unit 53 can set a processing time equivalent to 1.5 times or 2 times the processing speed of the image processing by clocking up the operating frequency of the processor.

The storage device 54 stores data such as control data, control programs, and the setting information. The storage device 54 is configured with a rewritable and non-volatile memory. For example, the storage device 54 is configured with a storage device such as a hard disk drive (HDD) or a solid state drive (SSD).

The storage device 54 also includes a scan counter and a print counter. The scan counter counts the number of pages scanned by using the scanner 2. In the digital multi-functional peripheral 1 as the image forming device according to this embodiment, the scan counter counts the number of pages scanned for each scanning speed. The print counter counts the number of pages printed by using the printer 3. In the digital multi-functional peripheral 1 as the image forming device according to this embodiment, the print counter counts the number of pages printed at each print speed.

The communication I/F 55 is an interface for data communication with an external device. For example, the communication I/F 55 is an interface communicating with the external device as the output destination for outputting the image scanned by the network scanning function. Further, the communication I/F 55 is an interface receiving the image for printing and the print instruction from the external device by the network print function. The communication I/F 55 also includes an interface for transmitting FAX data generated from the image scanned by the FAX function to the FAX transmission destination. In addition, the communication I/F 55 may be an interface for communicating with the external device (such as a server) collecting values of the scan counter and the print counter, or the like.

Next, a configuration example of the control system in the printer 3 will be described. As illustrated in FIG. 2, the printer 3 includes the processor 70, a memory 71, the conveyance system 23, the image forming unit 25, the exposure device 26, the transfer unit 28, the fixing device 29, and the like. The processor 70 implements various processes by executing the programs stored in the memory 71. For example, the processor 70 executes the programs to control the operation of each unit in the printer 3 and monitor the operation status of each unit. In addition, the processor 70 is connected to the processor 50 of the system control unit 5 via the interface. The processor 70 performs print processing and the like in response to operation instructions from the system control unit 5.

The memory 71 includes memories such as a random access memory (RAM), a read only memory (ROM), and a data memory. The RAM functions as a working memory or a buffer memory. The ROM is a non-rewritable and non-volatile memory. The ROM functions as a program memory. The data memory is a rewritable and non-volatile memory. The conveyance system 23 conveys the paper in the printer 3 under the control of the processor 70. That is, the conveyance system 23 conveys the paper by driving the conveyance rollers of each unit in response to operation instructions from the processor 70.

The exposure device 26 irradiates each of the photosensitive drums of the image forming unit 25 with light (e.g., laser light) to form the electrostatic latent image in response to the operation instructions from the processor 70. The processor 70 adjusts the print position, magnification, and the like by controlling the irradiation position of the laser light on the photosensitive drum by the exposure device 26. The processor 70 performs the image adjustment so as to obtain the desired print range by controlling the operation according to the print range starting from the print reference described later.

The image forming unit 25 develops the electrostatic latent image formed on the photosensitive drum with toner of each color in response to the operation instructions from the processor 70. Further, the image forming unit 25 transfers the toner formed on the photosensitive drum onto the intermediate transfer belt 27.

The transfer unit 28 transfers the toner image transferred onto the intermediate transfer belt 27 onto the paper in response to the operation instructions from the processor 70. The fixing device 29 drives the heating roller 29b and the pressure roller 29c in response to the operation instructions from the processor 70. In addition, the heating unit 29a of the fixing device 29 sets the surface temperature of the heating roller 29b to a desired fixing temperature under the control of the processor 70. The fixing device 29 fixes the toner image transferred onto the paper, to the paper, in a state where the fixing temperature is controlled.

In addition, the processor 70 changes the printing operation speed (print speed) of each unit in the printer 3 in response to operation instructions from the processor 50. For example, if the print speed 1.5 times a default setting value is instructed, the processor 70 allows each unit to perform a print operation at the speed 1.5 times the default value. In addition, if the print speed two times the default setting value is instructed, the processor 70 allows each unit in the printer 3 to perform the print operation at the speed two times the default value.

Next, a configuration example of the control system in the operation panel 4 will be described. As illustrated in FIG. 2, the operation panel 4 includes the processor 80, a memory 81, the display unit (display) 41, the touch panel 42, the operation buttons 43, and the like. The processor 80 implements various processes by executing the programs stored in the memory 81. For example, the processor 80 executes the programs to control the operation of each unit of the operation panel 4 and monitor the operation status of each unit. In addition, the processor 80 is connected to the processor 50 of the system control unit 5 via the interface. For example, the processor 80 notifies the system control unit 5 of information input by the user.

The memory 81 includes memories such as a random access memory (RAM), a read only memory (ROM), and a data memory. The RAM functions as a working memory or a buffer memory. The ROM is a non-rewritable and non-volatile memory. The ROM functions as a program memory. The data memory is a rewritable and non-volatile memory.

The display content of the display unit 41 is controlled in response to the operation instructions from the processor 80. The touch panel 42 is provided on the display screen of the display unit 41 and detects the touched position on the display screen. For example, the processor 80 displays icons that can be selected on the touch panel 42 on the display screen of the display unit 41 along with operation guidance. The processor 80 determines information input by the user according to the touch position detected by the touch panel 42. The operation button 43 is configured with hard keys such as a start key and a reset key.

Next, a configuration example of the control system in the RFID device 6 will be described. As illustrated in FIG. 2, the RFID device 6 includes the processor 90, a memory 91, a communication control circuit 92, and an antenna 93. The processor 90 implements various processes by executing the programs stored in the memory 91. For example, the processor 90 controls the operation of each unit in the RFID device 6 by executing the programs. In addition, the processor 90 is connected to the processor 50 of the system control unit 5 via the interface. The processor 90 transmits commands to the RFID tags and performs response processing in response to operation instructions from the system control unit 5.

The memory 91 includes memories such as a random access memory (RAM), a read only memory (ROM), and a data memory. The RAM functions as a working memory or a buffer memory. The ROM is a non-rewritable and non-volatile memory. The ROM functions as a program memory. The data memory is a rewritable and non-volatile memory.

The communication control circuit 92 processes signals transmitted and received by the antenna 93. The communication control circuit 92 is connected to the processor 90 and the antenna 93. The communication control circuit 92 includes, for example, a modulation circuit, an amplification circuit, an output setting circuit, a demodulation circuit, and the like. The antenna 93 transmits and receives radio waves. The antenna 93 is connected to the communication control circuit 92. The antenna 93 transmits the signal from the communication control circuit 92 as the radio waves. In addition, the antenna 93 supplies the signal received as the radio waves to the communication control circuit 92.

For example, the communication control circuit 92 transmits the signals supplied from the processor 90 as the radio waves through the antenna 93. The communication control circuit 92 modulates the signal from the processor 90 with the modulation circuit, amplifies the modulated signal with the amplification circuit, and outputs the amplified signal from the antenna 93 as the radio waves. In addition, the communication control circuit 92 processes the radio waves received by the antenna 93 and supplies the processed radio waves to the processor 90. The communication control circuit 92 amplifies a radio wave signal received by the antenna 93 with the amplification circuit, demodulates the amplified signal with the demodulation circuit, and supplies the demodulated signal to the processor 90. The communication control circuit 92 also has a function of controlling a strength of the radio waves output from the antenna 93. The communication control circuit 92 outputs the radio waves at an output level set to the amplification circuit by the output setting circuit in response to the control command from the processor 90. That is, the RFID device 6 sets (adjusts) the strength of the radio waves output from the antenna 93 by the communication control circuit 92, so that the communication range with the RFID tag is set.

For example, the processor 90 sets the communication control circuit 92 so as to limit the communication range to only the write position if writing the data to the individual RFID tags of a medium S conveyed by the conveyance system 23. The communication control circuit 92 sets (adjusts) the output level (strength) of the radio waves output from the antenna 93 so that the predetermined write position set on the conveyance path of the conveyance system 23 is in the communication range. If the predetermined write position is in the communication range, the RFID device 6 can write correct data to the individual RFID tags which are passing through the write position.

In addition, if all the RFID tags of the medium S after passing through the write position are to be read targets, the processor 90 sets the communication control circuit 92 so that the communication range includes the entire medium S. The communication control circuit 92 sets the output level of the radio waves output from the antenna 63 so that the communication range becomes a range including the entire medium S, after the medium has passed through the write position. The RFID device 6 can read the data from all the RFID tags of the medium S if the area including the entire medium S after the medium has passed through the write position is in the communication range.

Figure 3:
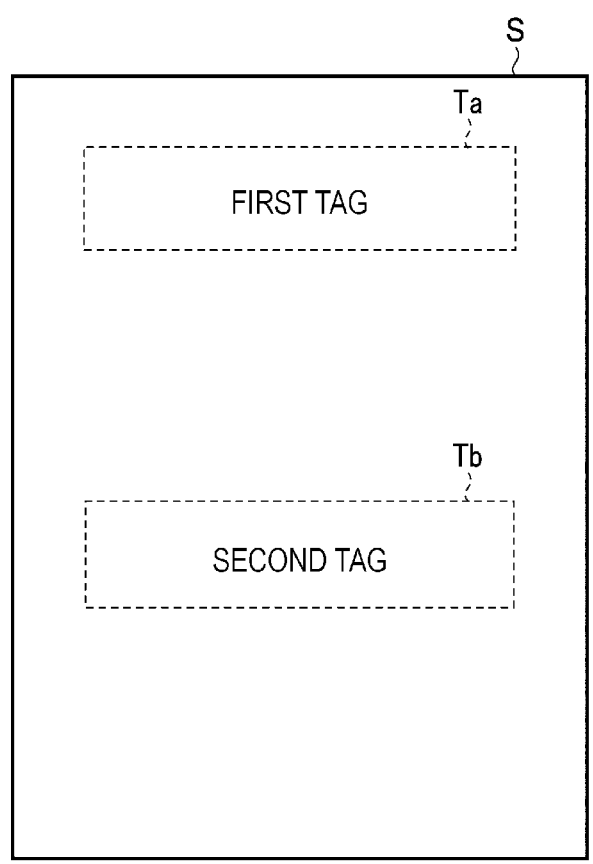
FIG. 3 is a diagram illustrating a configuration example of a medium provided with a plurality of RFID tags to be processed by the image forming device.

Next, a configuration example of the medium provided with the plurality of RFID tags to be processed by the digital multi-functional peripheral 1 as the image forming device including the medium processing device according to the embodiment will be described. FIG. 3 is a diagram illustrating the configuration example of the medium provided with the plurality of RFID tags to be processed by the digital multi-functional peripheral 1 as the image forming device including the medium processing device according to the embodiment. FIG. 3 illustrates a configuration example of the medium S (for example, paper) provided with a first RFID tag (hereinafter referred to as a first tag) Ta and a second RFID tag (hereinafter referred to as a second tag) Tb. The medium S has a shape that can be conveyed by the conveyance system 23 such as paper, and the printer 3 can print the image on a surface of the medium S.

The image can be printed on the entire surface of the medium S including a first area provided with the first tag Ta and a second area provided with the second tag Tb. For example, the first tag Ta and the second tag Tb are embedded in the paper as the medium S. Further, as an example of the medium S, the first area in which the first tag Ta is embedded and the second area in which the second tag Tb is embedded may each be configured as the seal.

In the medium S, the first tag Ta and the second tag Tb are arranged side by side in a lengthwise direction. If the medium S is conveyed along the lengthwise direction, the first tag Ta and the second tag Tb are conveyed sequentially through the predetermined area on the conveyance path. If the conveyance system 23 conveys the medium S along the long side direction, the first tag Ta and the second tag Tb sequentially pass through the predetermined write positions of the RFID device 6 set on the conveyance path. The first tag Ta and the second tag Tb perform the write process of writing the data in response to the command from the RFID device 6 when passing through the write position.

Figure 4:
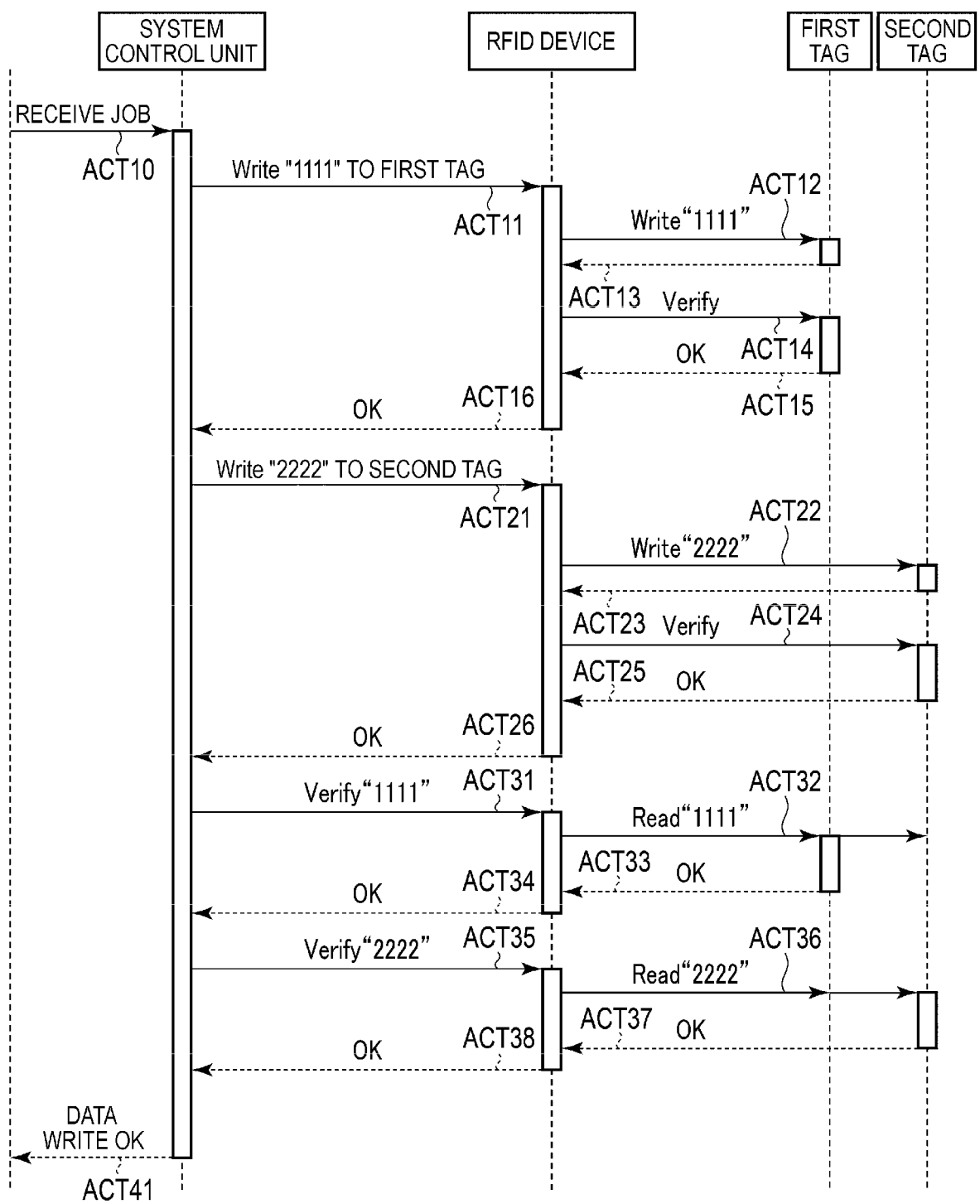
FIG. 4 is a sequence diagram illustrating an operation example in which the medium processing device successfully performs a write process of writing data to a first tag and a second tag of the medium.

Hereinafter, the write process of writing the data to the plurality of RFID tags by the digital multi-functional peripheral 1 as the image forming device including the medium processing device according to the embodiment will be described below. First, an operation example in the case where the digital multi-functional peripheral 1 according to the embodiment normally completes the write process of writing the data to the plurality of RFID tags of one medium S will be described. FIG. 4 is a sequence diagram illustrating the operation example of the digital multi-functional peripheral 1 in which the write process of writing the data to two RFID tags of one medium S has normally completed. The digital multi-functional peripheral 1 receives a job such as a printing job including the writing of the data to the two RFID tags of the medium S (ACT 10). For example, the system control unit 5 receives the job including the write process of writing the data to two RFID tags (first tag and second tag) of the medium S through the communication I/F 55. Herein, it is assumed that the job instructing to write first write data ("1111") to the first tag of the medium S and to write second write data ("2222") to the second tag is received.

The system control unit 5 controls the paper feed cassette 21 storing the medium S provided with the two RFID tags to supply the medium S. The system control unit 5 allows the conveyance system 23 to convey the medium S. When the conveyance system 23 starts conveying the medium S, the system control unit 5 instructs the RFID device 6 to write "1111" to the first tag of the medium S (ACT 11). If receiving a data write instruction, the RFID device 6 transmits the radio waves for the write process of writing the data to the write position on the conveyance path.

Herein, as illustrated in FIG. 3, the medium S is assumed to have the first tag Ta and the second tag Tb arranged side by side in the conveyance direction of the conveyance system 23. In this case, the first tag Ta reaches the write position on the conveyance path on the conveyance system 23 first (first), and the second tag Tb reaches next (second). If the first tag Ta of the medium S reaches the write position on the conveyance path of the medium S, the first tag Ta is activated by the radio waves from the RFID device 6 to output a response signal.

When receiving a response from the RFID tag (first tag) of the medium S, the RFID device 6 outputs a first write command instructing to write "1111" to the first tag (ACT 12).

The first tag of the medium S which is being conveyed receives the first write command from the RFID device 6 at the write position. If the first tag receives the first write command, the first tag performs the write process of writing the data ("1111") designated by the first write command. When writing "1111" designated by the first write command, the first tag transmits a response indicating the end of the writing to the RFID device 6 (ACT 13).

When receiving the response indicating the end of the writing, the RFID device 6 transmits a verification command requesting the confirmation that "1111" is correctly written to the tag (first tag) for which the writing is ended (ACT 14).

The first tag responding to the end of the writing of "1111" further receives the verification command from the RFID device 6. When receiving the verification command, the first tag confirms that the written data is "1111". When confirming that "1111" is written, the first tag transmits a response indicating confirmation success (OK) to the RFID device 6 (ACT 15).

The RFID device 6 receives the response confirming that "1111" is written to the RFID tag (first tag) of the medium S. When confirming that "1111" is written to the RFID tag of the medium S, the RFID device 6 notifies the system control unit 5 of the completion of the writing of "1111" (ACT 16).

When receiving the notification of the completion of the writing of "1111" which is the first write data, the system control unit 5 instructs the RFID device 6 to write the second write data ("2222") to the second tag of the medium S (ACT 21). If the next tag (second tag) reaches the write position, the RFID device 6 outputs a second write command instructing to write "2222" to the second tag (ACT 22).

The second tag of the medium S which is being conveyed receives the second write command from the RFID device 6 at the write position. If the second tag receives the second write command, the second tag performs the write process of writing the data ("2222") designated by the second write command. When writing "2222" designated by the second write command, the second tag transmits the response indicating the end of the writing to the RFID device 6 (ACT 23).

If the RFID device 6 receives the response indicating the end of the writing, the RFID device 6 transmits a verification command requesting the confirmation that "2222" is correctly written to the tag (second tag) for which the writing is ended (ACT 24).

Herein, the second tag responding to the end of the writing of "2222" receives the verification command from the RFID device 6. When receiving the verification command, the second tag confirms that the written data is "2222". When confirming that "2222" is written, the second tag transmits the response indicating the confirmation success (OK) to the RFID device 6 (ACT 25).

The RFID device 6 receives the response confirming that "2222" is written to the RFID tag (second tag) of the medium S. When confirming that "2222" is written to the RFID tag of the medium S, the RFID device 6 notifies the system control unit 5 of the completion of the writing of "2222" (ACT 26).

When receiving the completion of the writing of the first write data and the second write data, the system control unit 5 confirms whether the two pieces of data are written to the two RFID tags of the medium S. The system control unit 5 confirms that there is the RFID tag to which "1111" is written and the RFID tag to which "2222" is written, for the entire medium S.

If the system control unit 5 receives the completion notification of the writing of "2222", the system control unit 5 determines that the RFID device 6 has finished writing the two pieces of write data to the RFID tag of the medium S. Upon receiving the completion notification of the writing of the data, the system control unit 5 instructs the RFID device 6 to read the first write data ("1111") with the entire medium S as a read area (ACT 31).

When receiving an instruction to read the data with the entire medium S as the read area, the RFID device 6 adjusts the output level of the radio waves so that the entire medium S is in the read area after passing through the write position. The RFID device 6 transmits a first read command instructing to read "1111" with the entire medium S as the read area (ACT 32).

The first tag and the second tag of the medium S after passing through the write position receive the first read command instructing to read "1111" from the RFID device 6. Herein, the first tag to which "1111" is written transmits a response indicating reading success (OK) to the RFID device 6 in response to the first read command (ACT 33). In this case, the second tag to which "1111" is not written (the RFID tag to which "2222" is written) does not respond to the first read command.

The RFID device 6 receives the response indicating reading success of "1111" with the entire medium S as the read area from the RFID tag (first tag) of the medium S. When receiving the response indicating the reading success of "1111", the RFID device 6 notifies the system control unit 5 that "1111" is read from the RFID tag of the medium S (ACT 34).

When receiving the response indicating the reading success of "1111", the system control unit 5 instructs the RFID device 6 to read the second written data ("2222") with the entire medium S as the read area (ACT 35).

When receiving an instruction to read "2222" with the entire medium S as the read area, the RFID device 6 transmits a second read command instructing to read "2222" with the entire medium S as the read area (ACT 36).

The first tag and the second tag of the medium S receive the second read command from the RFID device 6. Herein, the second tag to which "2222" is written transmits the response indicating the reading success (OK) to the RFID device 6 in response to the second read command (ACT 37). In this case, the first tag to which "2222" is not written (the RFID tag to which "1111" is written) does not respond to the second read command.

The RFID device 6 receives the response indicating reading success of "2222" with the entire medium S as the read area from the RFID tag (second tag) of the medium S. When receiving the response indicating the reading success of "2222", the RFID device 6 notifies the system control unit 5 that "2222" is read from the RFID tag of the medium S (ACT 38).

When receiving the notification indicating the reading success of the first write data and the second write data, the system control unit 5 determines that the write process of writing the data to the RFID tag of the medium S has normally completed (ACT 41). When determining that the write process has normally completed, the system control unit 5 may display the fact that the writing of the data to the two RFID tags of the medium S is ended on the display unit 41.

Figure 5:
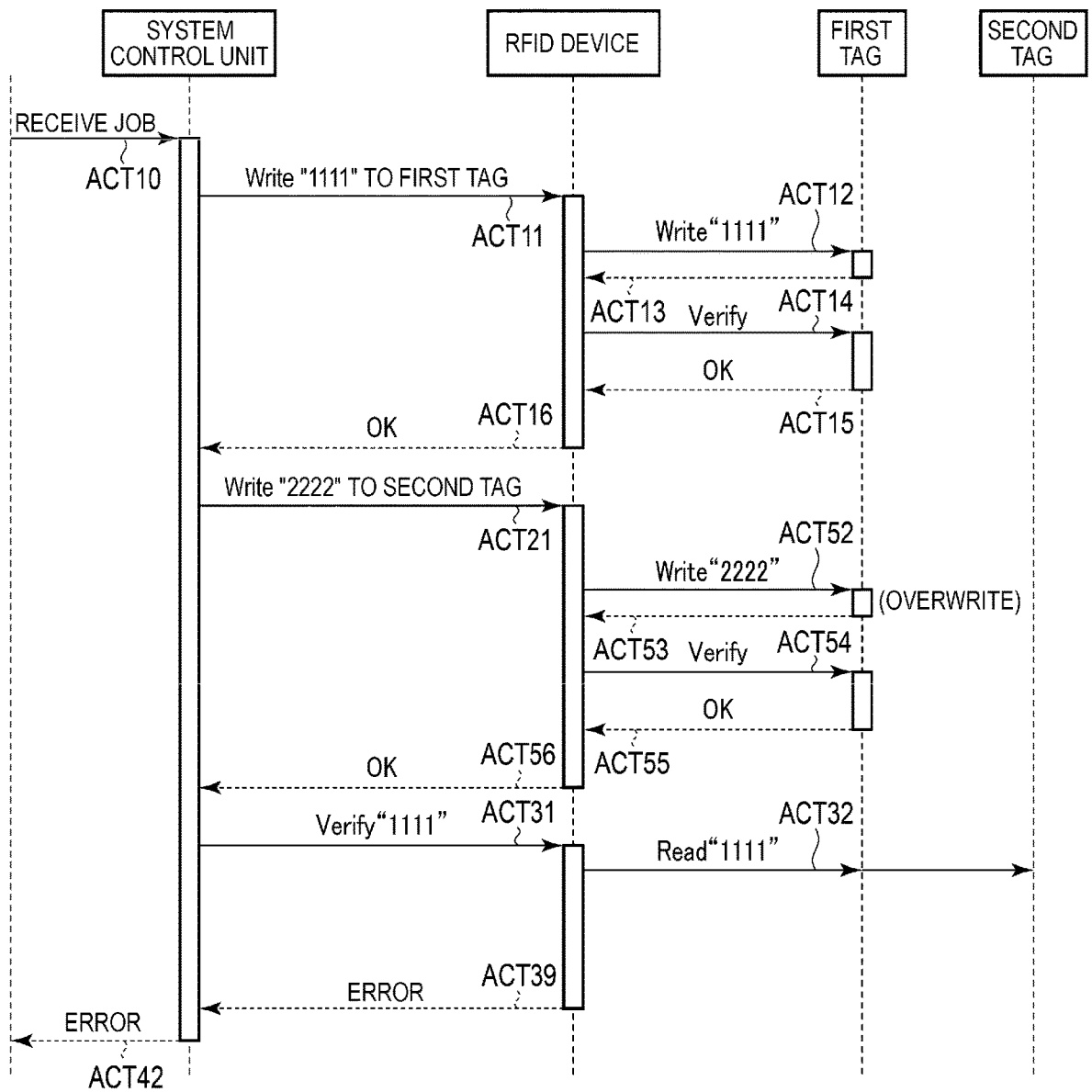
FIG. 5 is a sequence diagram illustrating an operation example in which the medium processing device fails to successfully perform the write process of writing the data to the first tag and the second tag of the medium.

Next, an operation example in which the digital multi-functional peripheral 1 according to the embodiment sets the write process of writing the data to the plurality of RFID tags of one medium S as an error will be described. FIG. 5 is a sequence diagram illustrating the operation example of the digital multi-functional peripheral 1 in which the write process of writing the data to the two RFID tags of one medium S is set as an error. The digital multi-functional peripheral 1 receives the job such as the printing job including the writing of the data to the two RFID tags of the medium S (ACT 10). Similarly to the operation example described above, the system control unit 5 is assumed to receive the job including the instruction to write the first write data ("1111") and the second write data ("2222") to the two RFID tags of the medium S.

The system control unit 5 performs control to supply the medium S provided with the two RFID tags and allows the conveyance system 23 to convey the medium S. If the conveyance system 23 starts conveying the medium S, the system control unit 5 instructs the RFID device 6 to write "1111" to the first tag of the medium S (ACT 11). When receiving the data write instruction, the RFID device 6 transmits the radio waves for the write process of writing the data with the write position on the conveyance path as the communication range. If the first tag of the medium S conveyed by the conveyance system 23 reaches the write position, the first tag is activated by the radio waves from the RFID device 6 to output the response signal.

When receiving the response from the RFID tag (first tag) of the medium S, the RFID device 6 outputs the first write command instructing to write "1111" to the first tag (ACT 12).

The first tag of the medium S which is being conveyed receives the first write command from the RFID device 6 at the write position. When receiving the first write command, the first tag performs the write process of writing the data designated by the first write command. When writing the data ("1111") designated by the first write command, the first tag transmits the response indicating the end of the writing to the RFID device 6 (ACT 13).

When receiving the response indicating the end of the writing, the RFID device 6 transmits the verification command requesting confirmation that "1111" is correctly written to the tag (first tag) for which the writing is ended (ACT 14).

The first tag responding to the end of the writing of "1111" receives the verification command from the RFID device 6. When receiving the verification command, the first tag confirms that the written data is "1111". When confirming that "1111" is written, the first tag transmits the response indicating the confirmation success (OK) to the RFID device 6 (ACT 15).

The RFID device 6 receives the response confirming that "1111" is written to the RFID tag (first tag) of the medium S. When confirming that "1111" is written to the RFID tag of the medium S, the RFID device 6 notifies the system control unit 5 of the completion of the writing of "1111" (ACT 16).

When receiving the notification of the completion of the writing "1111" which is the first write data, the system control unit 5 instructs the RFID device 6 to write the second write data ("2222") to the second tag of the medium S (ACT 21).

If the second RFID tag of the medium S reaches the write position, the RFID device 6 outputs the second write command instructing to write "2222" to the tag (ACT 52). Herein, it is assumed that the second write command from the RFID device 6 is received by the first tag of the medium S, not by the second tag.

When receiving the second write command, the first tag performs the write process of writing "2222" designated by the second write command. Herein, since "1111" is written to the first tag by the first write command, "1111" is overwritten with "2222". When writing "2222" designated by the second write command, the first tag transmits the response indicating the end of the writing to the RFID device 6 (ACT 53).

When receiving the response indicating the end of the writing, the RFID device 6 transmits the verification command requesting the confirmation that "2222" is correctly written to the tag (first tag) for which the writing is ended (ACT 54).

Herein, the first tag responding to the end of the writing of "2222" receives the verification command from the RFID device 6. The first tag receiving the verification command confirms that the written data is "2222". When confirming that "2222" is written, the first tag transmits the response indicating the confirmation success (OK) to the RFID device 6 (ACT 55).

The RFID device 6 receives the response confirming that "2222" is written to the RFID tag (first tag) of the medium S. When confirming that "2222" is written to the RFID tag of the medium S, the RFID device 6 notifies the system control unit 5 of the completion of the writing of "2222" (ACT 56).

When receiving the completion notification of the writing of the two pieces of write data, the system control unit 5 confirms that "1111" and "2222" are written to the two RFID tags of the medium S. Herein, the system control unit 5 confirms that there is the RFID tag to which "1111" is written and the RFID tag to which "2222" is written, for the entire medium S.

When receiving the completion notification of the writing of "2222", the system control unit 5 determines that the writing of the two pieces of data to the RFID tag of the medium S by the RFID device 6 has ended. Upon determining that the writing of the two pieces of data has ended, the system control unit 5 instructs the RFID device 6 to read the first written data ("1111") with the entire medium S as the read area (ACT 31).

When receiving the instruction to read the data with the entire medium S as the read area, the RFID device 6 adjusts the output level of the radio waves so that the entire medium S is in the read area after passing through the write position. The RFID device 6 transmits the first read command instructing to read "1111" to the RFID tag with the entire medium S as the read area (ACT 32).

The first tag and the second tag of the medium S after passing through the write position in the read area receive the first read command instructing to read "1111" from the RFID device 6. Herein, since "2222" is overwritten in the first tag, the RFID tag to which "1111" is written does not exist in the medium S. For this reason, the RFID device 6 cannot receive the response indicating the reading success of "1111" (OK). If the RFID device 6 cannot receive the response to the first read command in the predetermined period of time, the RFID device 6 notifies the system control unit 5 of reading error (ACT 39).

When receiving the reading error of "1111" which is the first write data, the system control unit 5 determines that the writing of the data to the RFID tag of the medium S fails (ACT 42). When determining that the write process of writing the data fails, the system control unit 5 displays an error guidance indicating that the writing of the data to the RFID tag of the medium S fails on the display unit 41.

Figure 6:
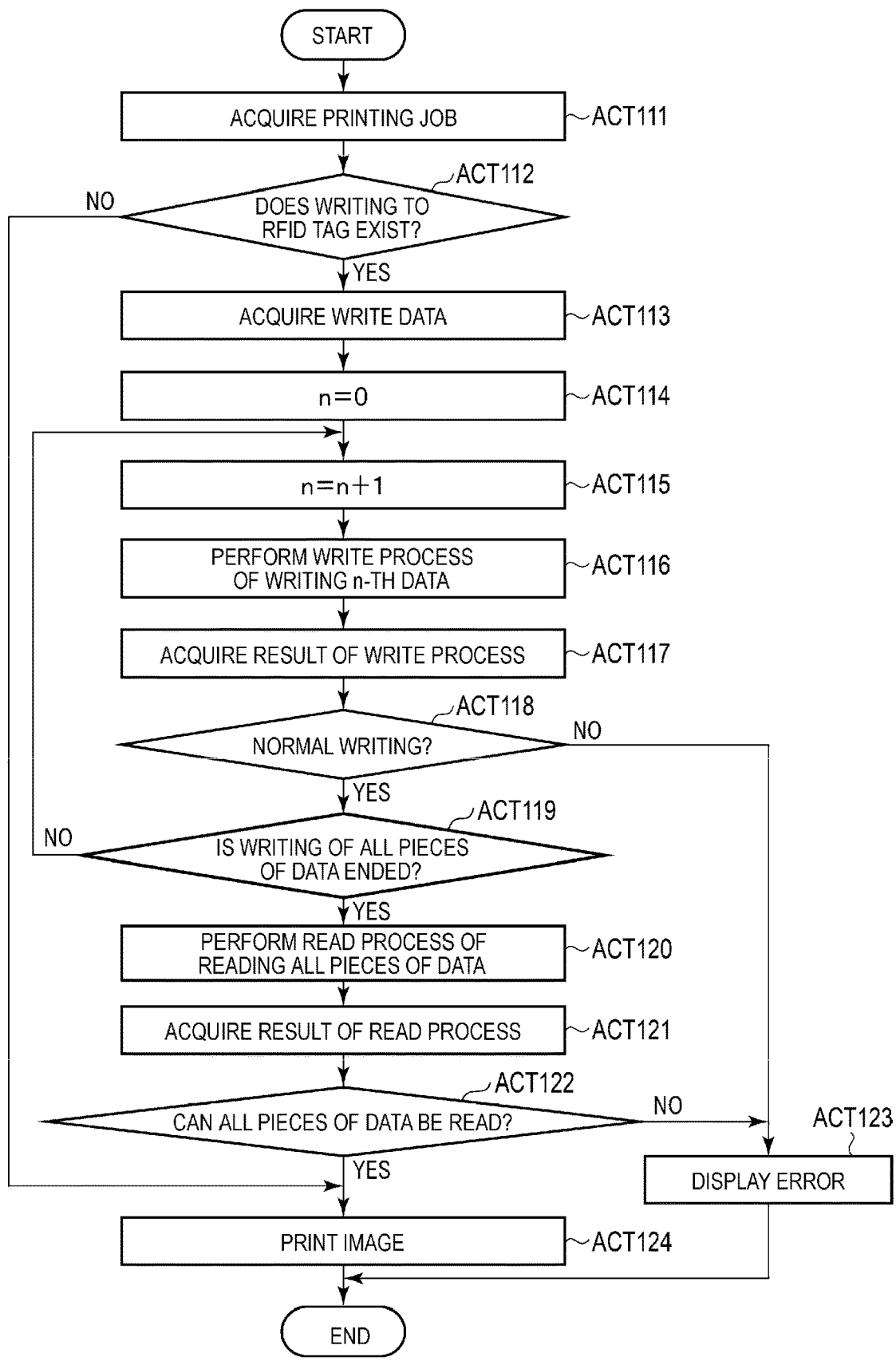
FIG. 6 is a flowchart illustrating an operation example of the digital multi-functional peripheral.

Next, an operation example if the digital multi-functional peripheral 1 according to the embodiment receives the printing job including the write process of writing the data to the plurality of RFID tags of one medium will be described. FIG. 6 is a flow chart illustrating the operation example according to the printing job including the write process of writing the data to the plurality of RFID tags of the medium by the digital multi-functional peripheral 1. The system control unit 5 of the digital multi-functional peripheral 1 acquires the printing job received from the communication I/F 55 or the printing job according to a user operation on the operation panel 4 (ACT 111).

When acquiring the printing job, the processor 50 of the system control unit 5 determines whether or not the printing job is a process including writing of the data to the RFID tag of the medium S (ACT 112). If the printing job does not include the write process of writing the data to the RFID tag (ACT 112, NO), the processor 50 performs image printing according to the printing job (ACT 124).

If the printing job includes the write process of writing the data to the RFID tag (ACT 112, YES), the processor 50 acquires the data to be written to the RFID tag of one medium (ACT 113). For example, the processor 50 acquires the plurality of pieces of write data to be written to the plurality of RFID tags of one medium based on the printing job.

When acquiring the plurality of pieces of write data, the processor 50 defines a variable n and initializes the defined variable n (n=0) (ACT 114). After initializing the variable n, the processor 50 increments the initialized variable n (n=n+1) (ACT 115). When incrementing the variable n, the processor 50 instructs the RFID device 6 to perform the write process of writing the n-th data among the data to be written to the RFID tag of the medium S (ACT 116). The RFID device 6 performs the write process of writing the n-th data to the n-th RFID tag that is conveyed to the write position in response to the instruction from the processor 50. For example, as described with reference to FIG. 4 or FIG. 5, the RFID device 6 performs the write process including the writing of the data and the confirming (verifying) of the data for one RFID tag at the write position.

The processor 50 acquires information indicating a result of the write process of writing the n-th data from the RFID device 6 to the RFID tag of the medium S (ACT 117). When acquiring the result of the write process, the processor 50 determines whether or not the n-th data is successfully written to the RFID tag of the medium S (ACT 118).

If the writing of the data fails (ACT 118, NO), the processor 50 displays the error guidance to notify that the writing of the data to the RFID tag fails on the display unit 41 (ACT 123). In this case, the processor 50 may display the error guidance and discharge the medium S taken in by the conveyance system 23 of the printer 3.

If the writing of the n-th data is successful (ACT 118, YES), the processor 50 determines whether or not the writing of all pieces of write data to the RFID tag is ended (ACT 119). If the writing of all pieces of data is not ended (ACT 119, NO), the processor 50 returns to ACT 115, increments the variable n, and repeats the above-described process.

If the writing of all pieces of the data is ended (ACT 119, YES), the processor 50 performs a read process of reading n pieces of data from each RFID tag of the medium S to be processed (ACT 120). The processor 50 performs the read process of reading n pieces of data with the entire medium S as the read area of the RFID tag by the RFID device 6. For example, as described with reference to FIG. 4 or FIG. 5, the processor 50 instructs the RFID device 6 to read each piece of data set as the write data. The RFID device 6 performs the read process of reading the data instructed from the processor 50 with the entire medium S as the read area.

The processor 50 acquires a result of the read process of reading each piece of data from the RFID device 6 (ACT 121). The processor 50 determines whether or not all pieces of data are read from each RFID tag of the medium S based on the result of the read process from the RFID device 6 (ACT 122). If all pieces of data are read from the medium S (ACT 122, YES), the processor 50 determines that the write process of writing the data to the plurality of RFID tags of the medium S is successful. If any piece of data cannot be read (ACT 122, NO), the processor 50 determines that the write process of writing the data to the plurality of RFID tags of the medium S fails.

If the processor 50 fails to read the data, that is, if the writing of the data to the plurality of RFID tags of the medium S fails, the processor 50 displays the error guidance on the display unit 41 (ACT 123). For example, the processor 50 displays the error guidance notifying that the writing of the data to the plurality of RFID tags of the medium S fails on the display unit 41. Further, when displaying the error guidance, the processor 50 may discharge the medium S taken in by the conveyance system 23 of the printer 3.

When reading all pieces of data, that is, when successfully performing the write process of writing the data to the plurality of RFID tags of the medium S, the processor 50 performs the image printing on the medium S (ACT 124). For example, the processor 50 prints the image designated by the printing job on the surface of the medium S.

It is noted that the digital multi-functional peripheral 1 may perform the image printing on the medium S in parallel with the write process or the read process on the plurality of RFID tags of the medium S. It is noted that the digital multi-functional peripheral 1 may perform the above-described write process of writing the data or the read process of reading the data on the plurality of RFID tags of the medium S for which the image printing is completed.

As described above, the digital multi-functional peripheral according to the embodiment performs the write process of writing the plurality of pieces of write data to the plurality of RFID tags of the medium by using the RFID device. In the digital multi-functional peripheral, the communication range of the RFID device is defined as the area including the entire medium to which the writing of the plurality of pieces of data is completed. The digital multi-functional peripheral performs the read process of reading all pieces of written data from the RFID tag of the medium with the entire medium as the read area. The digital multi-functional peripheral detects a failure in the write process of writing the data to the RFID tag if all pieces of written data cannot be read from the RFID tag of the medium. Therefore, in the digital multi-functional peripheral according to the embodiment, it is possible to confirm that the plurality of pieces of data are correctly written to the plurality of RFID tags of the medium. In the embodiments described above, the medium S has two RFID tags. In some embodiments, the medium may have three or more RFID tags. Alternatively, the medium may have a single RFID tag and two or more media, each having a single RFID tag, may be processed in the same manner as a single medium having two RFID tags as described above.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A medium processing device comprising:
a conveying mechanism;
a radio frequency identification (RFID) device configured to communicate with RFID tags; and
a processor configured to execute a job according to which the processor controls the RFID device to perform a write process on first and second RFID tags of at least one medium conveyed by the conveying mechanism when the first and second RFID tags are moved to a write position along a conveyance path of the at least one medium, and a read process on the first and second RFID tags after the at least one medium is further conveyed along the conveyance path of the at least one medium by the conveying mechanism, wherein the RFID device includes an antenna by which the RFID device communicates with the RFID tags and is configured to set a communication range of the antenna to a first communication range during the write process and to a second communication range wider than the first communication range during the read process, and
the write process includes a first process to write data to the first RFID tag, verify that correct data has been written to the first RFID tag, and display an error guidance and terminate the job when writing of the correct data to the first RFID tag is not verified, and a second process to write data to the second RFID tag, verify that correct data has been written to the second RFID tag, and display an error guidance and terminate the job when writing of the correct data to the second RFID tag is not verified, and the read process includes a third process to further verify that correct data has been written to the first and second RFID tags and display an error guidance and terminate the job when writing of the correct data to the first and second RFID tags is not verified.

2. The medium processing device according to claim 1, wherein
the at least one medium is a single sheet of paper that has a plurality of RFID tags including the first and second RFID tags.

3. The medium processing device according to claim 2, wherein the processor controls the RFID device to perform the first process as the first RFID tag is passing through the write position, the second process when the second RFID tag is passing through the write position, and the third process when the single sheet is further conveyed by the conveying mechanism to a read position along the conveyance path.

4. The medium processing device according to claim 3, wherein the second RFID tag is outside the first communication range when the first RFID tag is passing through the write position and the first RFID tag is outside the first communication range when the second RFID tag is passing through the write position.

5. The medium processing device according to claim 4, wherein both the first and second RFID tags are within the second communication range when the single sheet is conveyed to the read position.

6. The medium processing device according to claim 1, wherein
the at least one medium includes a first sheet of paper that has the first RFID tag and a second sheet of paper that has the second RFID tag.

7. The medium processing device according to claim 6, wherein the second RFID tag is outside the first communication range when the first RFID tag is passing through the write position and the first RFID tag is outside the first communication range when the second RFID tag is passing through the write position.

8. The medium processing device according to claim 7, wherein both the first and second RFID tags are within the second communication range when the first and second sheets are further conveyed by the conveying mechanism to respective first and second read positions along the conveyance path.

9. The medium processing device according to claim 1, wherein
the processor, during execution of the job, controls the RFID device to perform the write process on each RFID tag at a time the RFID tag is passing through the write position.

10. The medium processing device according to claim 1, further comprising:
a display, wherein
the processor, in response to determining that the job has failed, causes the display to display an error guidance notifying that the job has failed.

11. An image forming device comprising:
a conveying mechanism;
a printer configured to form an image on a medium conveyed by the conveying mechanism;
a radio frequency identification (RFID) device configured to communicate with RFID tags; and
a processor configured to execute a job according to which the processor controls the RFID device to perform a write process on first and second RFID tags of at least one medium conveyed by the conveying mechanism when the first and second RFID tags are moved to a write position along a conveyance path of the at least one medium, and a read process on the first and second RFID tags after the at least one medium is further conveyed along the conveyance path of the at least one medium by the conveying mechanism, wherein
the RFID device includes an antenna by which the RFID device communicates with the RFID tags and is configured to set a communication range of the antenna to a first communication range during the write process and to a second communication range wider than the first communication range during the read process, and
the write process includes a first process to write data to the first RFID tag, verify that correct data has been written to the first RFID tag, and display an error guidance and terminate the job when writing of the correct data to the first RFID tag is not verified, and a second process to write data to the second RFID tag, verify that correct data has been written to the second RFID tag, and display an error guidance and terminate the job when writing of the correct data to the second RFID tag is not verified, and the read process includes a third process to further verify that correct data has been written to the first and second RFID tags and display an error guidance and terminate the job when writing of the correct data to the first and second RFID tags is not verified.

12. The image forming device according to claim 11, wherein the at least one medium is a single sheet of paper that has a plurality of RFID tags including the first and second RFID tags.

13. The image forming device according to claim 12, wherein the processor controls the RFID device to perform the first process as the first RFID tag is passing through the write position, the second process when the second RFID tag is passing through the write position, and the third process when the single sheet is further conveyed by the conveying mechanism to a read position along the conveyance path.

14. The image forming device according to claim 13, wherein the second RFID tag is outside the first communication range when the first RFID tag is passing through the write position and the first RFID tag is outside the first communication range when the second RFID tag is passing through the write position.

15. The image forming device according to claim 14, wherein both the first and second RFID tags are within the second communication range when the single sheet is conveyed to the read position.

16. A control method for a medium processing device, comprising:
conveying at least one medium that includes first and second RFID tags along a conveyance path;
controlling a radio frequency identification (RFID) device to perform a write process on the first and second RFID tags when the first and second RFID tags of at least one medium are conveyed to a write position along the conveyance path;
controlling the RFID device to perform a read process on the first and second RFID tags by the RFID device after the at least one medium is further conveyed along the conveyance path; and
setting a communication range of an antenna of the RFID device to a first communication range during the write process and to a second communication range wider than the first communication range during the read process,
wherein the write process includes a first process to write data to the first RFID tag, verify that correct data has been written to the first RFID tag, and display an error guidance and terminate the job when writing of the correct data to the first RFID tag is not verified, and a second process to write data to the second RFID tag, verify that correct data has been written to the second RFID tag, and display an error guidance and terminate the job when writing of the correct data to the second RFID tag is not verified, and the read process includes a third process to further verify that correct data has been written to the first and second RFID tags and display an error guidance and terminate the job when writing of the correct data to the first and second RFID tags is not verified.

17. The control method for a medium processing device according to claim 16, wherein
the at least one medium is a single sheet of paper that has a plurality of RFID tags including the first and second RFID tags.

18. The control method for a medium processing device according to claim 17, wherein
the first process is performed as the first RFID tag is passing through the write position, the second process is performed as the second RFID tag is passing through the write position, and
the third process is performed when the single sheet is further conveyed to a read position along the conveyance path.

19. The control method for a medium processing device according to claim 18, wherein
the second RFID tag is outside the first communication range when the first RFID tag is passing through the write position and the first RFID tag is outside the first communication range when the second RFID tag is passing through the write position.

20. The control method for a medium processing device according to claim 19, wherein
both the first and second RFID tags are within the second communication range when the single sheet is conveyed to the read position.

* * * * *